United States Patent [19]
Davis

[11] 3,788,755
[45] Jan. 29, 1974

[54] SAFETY ZONE FUEL SYSTEM FOR MOBILE DIRECT SERVICE UNITS

[75] Inventor: Delles T. Davis, Abilene, Tex.

[73] Assignee: Development Research Ltd., Houston, Tex.

[22] Filed: Oct. 21, 1971

[21] Appl. No.: 191,223

[52] U.S. Cl. ............................................. 404/1
[51] Int. Cl. ............................................. E01c 1/00
[58] Field of Search ............................ 404/1; 14/1

[56] References Cited
UNITED STATES PATENTS
3,562,984   2/1971   Merle .................................... 94/1 R
3,405,612   10/1968  Pearson ................................. 94/1 R
3,391,620   7/1968   Mahoney ............................... 94/1 R Primary Examiner—Nile C. Byers, Jr.
Attorney, Agent, or Firm—Pravel, Wilson and Matthews

[57] ABSTRACT

A safety zone fuel system for servicing motor vehicles with a mobile direct service unit from a barrier protected service area within the boundary marked safety zone. In one embodiment a fueling lane service area enables the mobile direct service unit to move along the fueling lane for servicing a plurality of vehicles parked adjacent the fueling lane while automatically movable barrier sections allow pedestrain traffic to cross the fueling lane.

8 Claims, 5 Drawing Figures

PATENTED JAN 29 1974

SAFETY ZONE FUEL SYSTEM FOR MOBILE DIRECT SERVICE UNITS

CROSS REFERENCE TO RELATED APPLICATION

This application is related to my copending application entitled "MOBILE STATION FOR DELIVERY OF PETROLEUM PRODUCTS," Ser. No. 113,493, filed Feb. 8, 1971.

BACKGROUND OF THE INVENTION

This invention relates to the field of a safety zone fueling system.

My copending application, Serial No. 113,493, disclosed a mobile direct service unit for transporting servicing products, including fuel, to the motor vehicles requiring such service. While that invention did satisfy a useful need, the mobile direct service unit did present at times a safety hazard due to the large quantity of flammable material carried by the unit. One of the times of enhanced risk was in fueling a vehicle from the unit in a vehicle parking lot having a traffic flow, both vehicular and pedestrian, which is random and often heavy. The possibility of an inadvertent collision with a vehicle rupturing the fuel supply tank of the service unit and resulting in a disasterous fire requires that this mode of marketing be done carefully.

SUMMARY OF THE INVENTION

This invention relates to a new and improved safety zone fuel system for mobile direct service units.

The safety zone fuel system includes a boundary marked safety zone vehicle parking surface having a service area for the direct service unit and at least one vehicle parking space adjacent the service area for positioning thereon a vehicle to be serviced. Barrier means are provided to block inadvertent movement of a vehicle into the service area. In one embodiment a fueling lane service area enables the mobile direct service unit to move along tracks in the fueling lane for servicing a plurality of vehicles parked adjacent the fueling lane while automatically movable barrier sections allow pedestrian traffic to cross the fueling lane. An underground primary fuel storage tank is provided to replenish the service unit in the fueling lane.

An object of the present invention is to provide a new and improved safety zone fuel system for mobile direct service units.

Another object of the present invention is to provide a new and improved safety zone fuel system having a segregated movement lane for mobile direct service units.

DESCRIPTION OF THE PREFERRED EMBODIMENT

Attention is directed to the FIGS. where the safety zone fuel system of the present invention is illustrated. The safety zone of dispersing area is designated Z and comprises at least a portion of the surface of a vehicle parking lot L and has a sufficient parking surface area for location thereon at least a mobile direct service unit U and a vehicle V to be serviced by the unit U. The direct service unit U, illustrated in FIGS. 2 and 4, and set forth in my copending application, Ser. No. 113,493, is a self-propelled mechanism adapted for transporting the products, including fuel, required to service a vehicle V to the vehicle V. The operator of the unit U also serves as an attendant for performing the needed services on the vehicle V.

The safety zone Z includes a brightly colored boundary marker 10 defining the limits of the safety zone Z and having the words "FUEL ZONE" and "NO SMOKING" placed thereon in contrasting colors. The words are spaced about the boundary 10 to alert the public of the safety zone service operation. Also spaced about the periphery or boundary 10 of the safety zone Z are a plurality of upstanding markers 11 including flags, lights or similar devices to alert the public of the service operation. Preferably these upstanding markers 11 are placed at the corners of the safety zone Z and extend upwardly at least 3 feet but less than 6 feet above ground level. Suitable lighting, not illustrated, may be provided to illuminate the boundary 10 and the upstanding markers 11 at night.

The safety zone 11 defined by the boundary 10 comprises a parking area for locating thereon at least the mobile direct service unit U and the vehicle V to be serviced. Preferably the safety zone Z surface comprises a portion of a parking area provided by a business, located in a building X, for the business customers.

The safety zone Z includes a service area A and a parking space S for positioning thereon the mobile direct service unit U and a vehicle V, respectively. The parking space S is located adjacent the service area A for enabling the vehicle V to be positioned on the parking space S to be serviced by the direct service unit U. Ingress and egress of the vehicle V with respect to the parking space S is illustrated by the directional arrows in FIG. 1. An additional parking space S may be located across the service area A from the illustrated parking space S to provide a plurality of vehicle parking spaces S for positioning thereon a corresponding plurality of vehicles V to receive service from the mobile direct service unit U positioned on the service area A. The boundary 10 of the safety zone Z would be extended to accommodate the additional parking spaces S.

Figure 2:
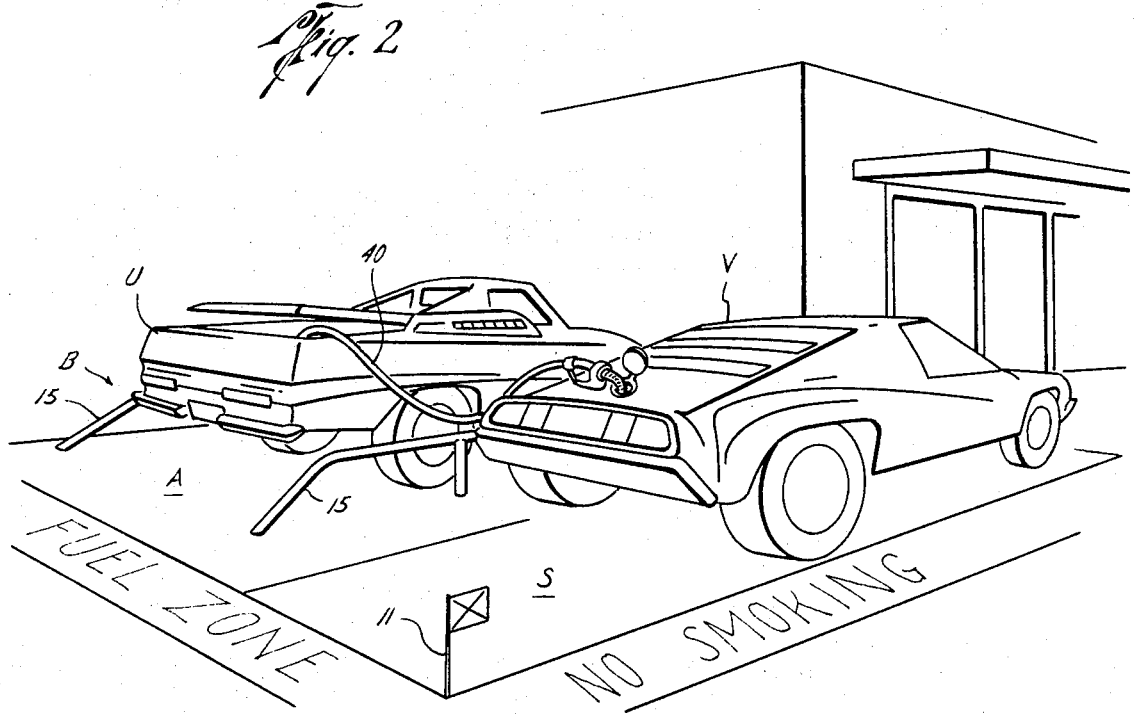
FIG. 2 is a perspective view, illustrating operation of the embodiment of the safety zone system of FIG. 1.

Positioned between the service area A and the vehicle parking spaces S is a barrier means B for blocking undesired movement of the vehicle into the surface area A where it could come into damaging contact with the service unit U. The barriers B should be of such size, strength and conformity to withstand the collision of the vehicle V for protecting the service unit U. As illustrated in FIG. 2, the barrier means B may include a fixed guard rail 15 for protecting the service unit U. A disappearing barrier means B may also be used as will be set forth in greater detail hereinafter.

The parking lot L includes a fenced storage area F for parking the direct service unit U therein when the mobile direct service unit U is not operating and is unattended. The storage area F is of suitable area to receive the service unit U therein to secure the unit U against the entry of unauthorized persons. The storage area F has a fence 17 thereabout for confining the service unit U. Preferably the fence 17 is at least 6 feet in height and has a gate 17a for enabling ingress and egress of the service unit U with the storage area F.

Figure 1:
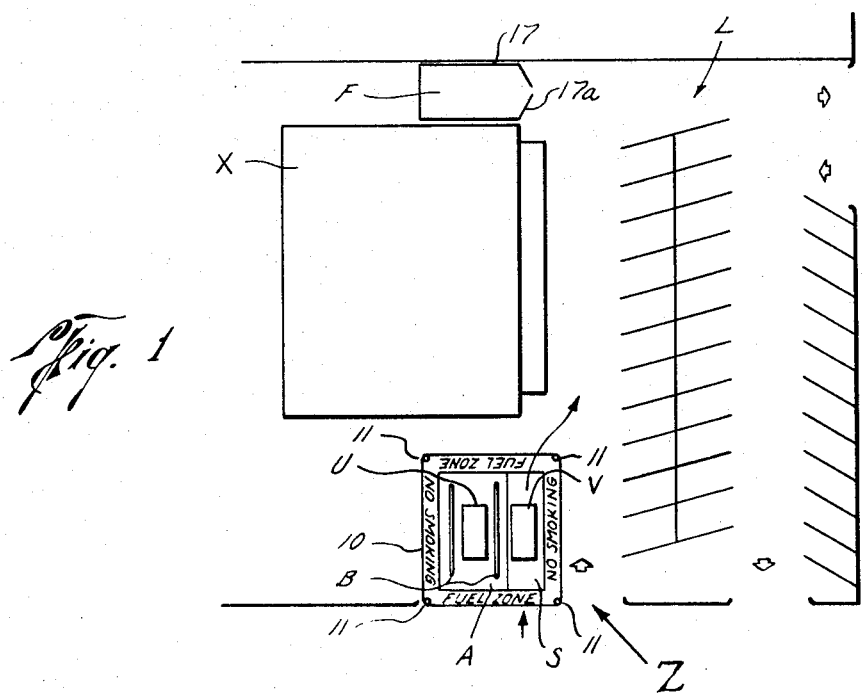
FIG. 1 is a plan view, illustrating an embodiment of the safety zone of the present invention.
Figure 3:
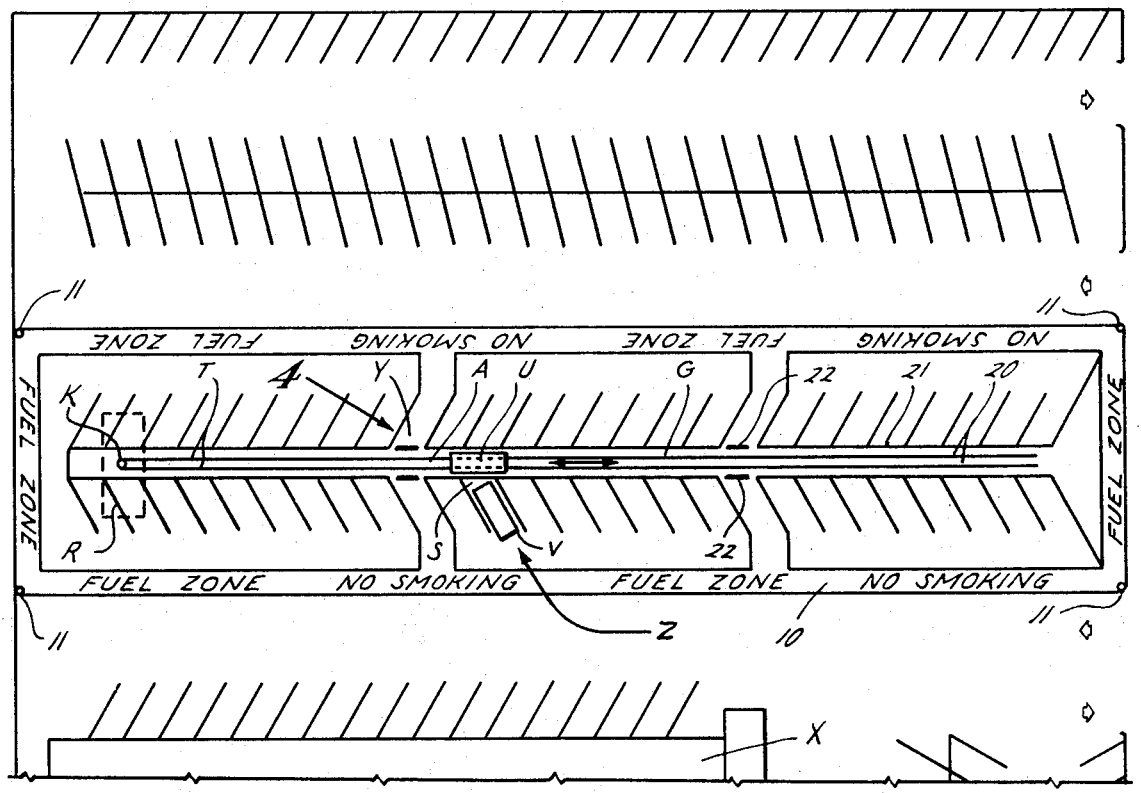
FIG. 3 is a plan view, illustrating another embodiment of the safety zone of the present invention.
Figure 5:
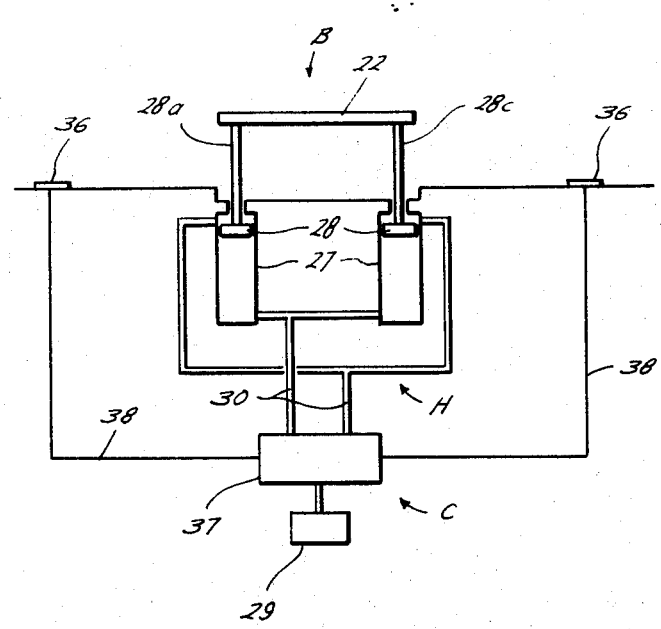
FIG. 5 is a schematic view of the means effecting automatic movement of a barrier section illustrated in FIG. 4.
Figure 4:
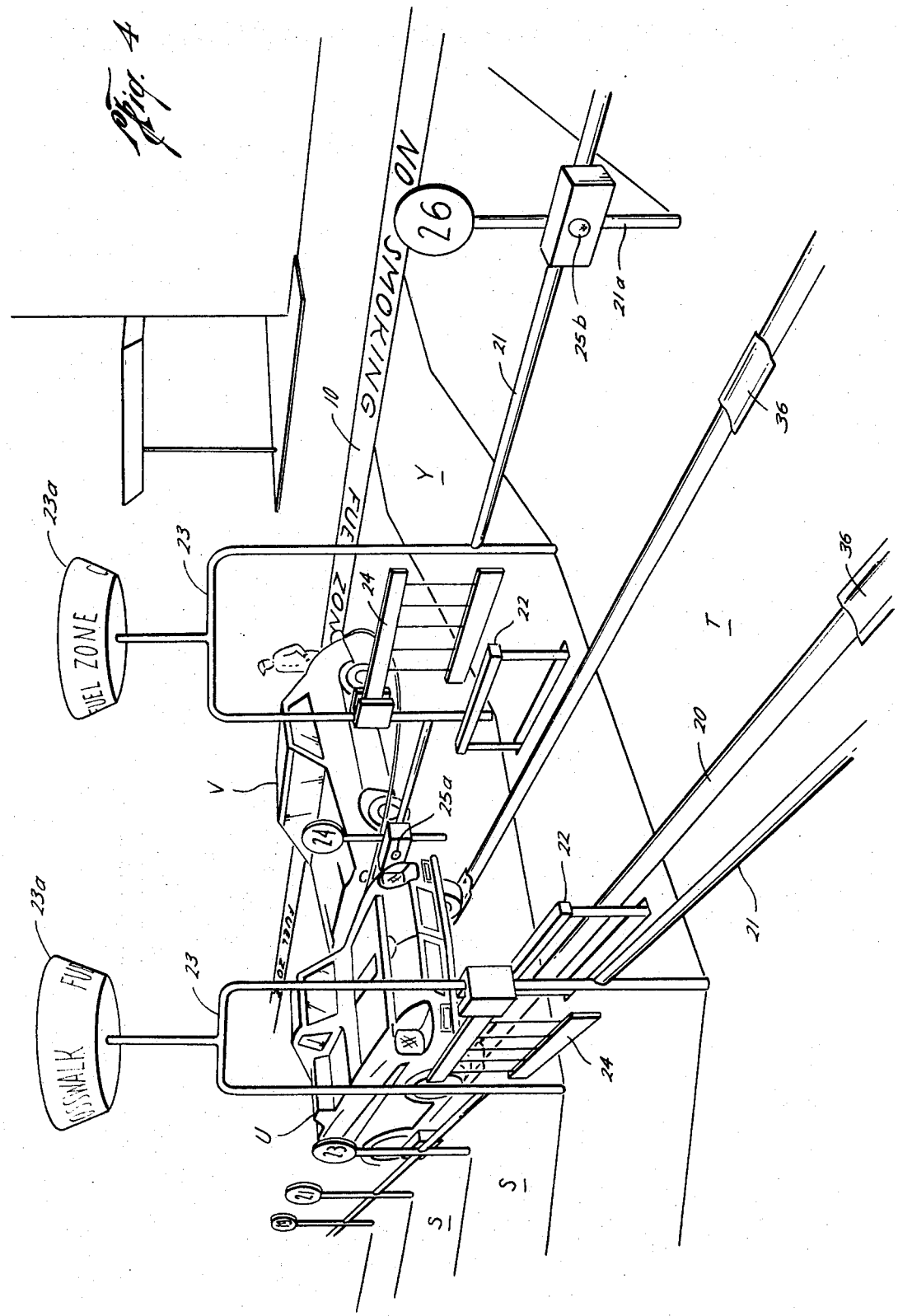
FIG. 4 is a perspective view, illustrating operation of the embodiment of the safety zone system of FIG. 3.

While the embodiment illustrated in FIGS. 1 and 2 is particularly well suited for use in conjunction with a "self-service" convenience store, the use of this embodiment of the safety zone fuel system should not be so limited. Likewise the embodiment of the present invention illustrated in FIGS. 3, 4 and 5 is particularly well suited for large shopping centers, but again it should not be considered so limited. In the embodiment illustrated in FIGS. 3, 4 and 5 like reference characters will be used to designate identical portions of the safety zone fuel system.

As illustrated in FIG. 3, the safety zone Z of the second embodiment includes a service area A and a parking space S. The service area A includes a fueling lane or track T for enabling movement of the mobile direct service unit U along the lane T to a desired location. A plurality of vehicle parking spaces S are located adjacent the lane T for positioning thereon a corresponding plurality of vehicles V to receive service from the service unit U moving along the lane T. The parking spaces S are located on either side of the lane T within the safety zone Z.

The lane T includes means G guiding movement of the mobile direct service unit U along the lane T to keep the service unit U from coming into contact with the barrier means B. The guide means G may include a pair of parallel runners or rails (not illustrated) or a pair of ruts 20 extending the entire length of the lane T to serve as guides for the tire of the service unit U to insure that the unit U does not collide with the barrier means B which bounds the lane T. The fueling lane T surface is graded or shaped to contain any flammable fluid deposited or spilled by the service unit U thereon to confine the fuel spills to reduce the risk of fire from a discarded cigarette.

The barrier means B is positioned in this embodiment between the fueling lane T and the plurality of vehicle parking spaces S on either side of the lane T for blocking undesired movement of a vehicle V into the fueling lane T. As illustrated in FIG. 4 the barrier means B is open ended to enable the direct service unit U to move into the lane T and includes parallel fixed horizontal members 21 mounted on barrier supporting uprights 21a and a plurality of movable barrier sections 22. The movable sections 22 are positioned on opposite sides of the lane T at pedestrian crossings Y to enable erecting of the barrier across the pedestrian crossing Y opening as desired. The fixed barrier members 21 have a pedestrian crossing opening frame 23 for mounting a warning sign 23a thereon. The frame 23 pivotally mounts a pedestrian gate 24 for controlling pedestrian movement through the crossing Y. Movement of the gate 24 between the pedestrian blocking position, illustrated, and a raised open position for enabling passage of pedestrians through the crossing Y is controlled by the electric eye sensors 25a and 25b. The direct service unit U moving along the lane T will break the beam of the electric eye 25a or 25b to automatically actuate well known means which operate to lower the gate 24 to the pedestrian blocking position. The continued movement of the direct service unit U will then break the beam of the other electric eye 25a or 25b to operate the gate 24 to automatically move to the open position when the direct service unit U clears the pedestrian crossing Y.

The barrier section 22 is movable to and from a first or lower position for enabling pedestrian traffic to move across the fueling lane T at the pedestrian crossing Y and which is moved to a second or raised position for blocking undesired movement of the vehicle V into the fueling lane T. The barrier means includes a means H for effecting movement of the movable section 22 to and from the first and second positions and a control means C for automatically actuating the means H for effecting movement of the movable section 22.

The means H for effecting desired movement of the movable section 22 includes an operating fluid cylinder 27 having a piston 28 movably disposed therein, a supply of operating fluid pressure 29 and an operating fluid connecting means 30 for communicating the operating fluid into the cylinder 27 for effecting desired movement of the piston 28. Any number of operating cylinders 27 may be connected with the movable section 22 to effect movement thereof, but preferably a paid of operating cylinders 27 having upwardly extending movable piston rods 28a secured to the pistons 28 are used for mounting the movable section 22 to effect the desired movement. Operating fluid pressure from the reservoir 29 communicated into the cylinder 27 below the piston 28 will urge the piston 28 to move upwardly to move the barrier 22 to the upper or blocking position. The fluid pressure communicated into the cylinder 27 above the piston 28 will urge the piston 28 to move downwardly to move the section 22 to the lower position enabling pedestrian traffic through the pedestrian crossing Y. The operating fluid connecting means 30 operably connects the cylinders 27 in parallel to enable the pistons 28 to move simultaneously for effecting movement of the barrier 22.

The control means C for automatically actuating said means H for effecting movement of the section 22 to the upward position when the direct service unit U is adjacent or moves across the pedestrian crossing Y includes a pair of trips or sensors 36 positioned in the ruts 20 and a control valve means 37 located in the fluid connecting means 30 and which is operably connected with the sensors 36 by suitable control lines 38. Movement of the direct service unit U along the track 20 toward the predestrian crossing Z will be sensed by the trip 36 which will then send a valve opening signal to the valve 37 through the control line 38. This signal operates the valve 37 to enable communication of the pressure reservoir 29 through the fluid connecting means 30 with the operating cylinder 27 below the piston 28. This fluid pressure will move the pistons 28 and the barrier member 22 to the upper position while the direct service unit U moves across the pedestrian crossing Y.

As the service unit U clears the pedestrian crossing Y, the movement will be sensed by the second trip unit 36 in the rut 20. The sensed movement will send an operating signal through the control line 38 to the control valve 37 to operate the control valve 37 to communicate the pressure reservoir 29 with the operating cylinders 27 above the pistons 28. This serves to automatically lower the barrier 22 when the mobile unit U clears the pedestrian crossing Y.

As illustrated in FIG. 3, the safety zone fuel system includes an underground primary fuel storage tank or reservoir R for replenishing the direct service unit U fuel supply tank. The tank R includes fuel conducting means or filler lines K for filling the service unit U from the reservoir R while the service unit U is preferably located in the fueling lane T. The filler lines K are provided with suitable check valves (not illustrated) for minimizing the spillage of flammable material when connecting the direct service unit U with filler line K. The tank R is vented to minimize the fire hazard.

In the use and operation of the embodiment of the present invention illustrated in FIG. 1 and 2, the direct service unit U is driven to the safety zone Z and parked on the service area A within the barrier 15. The vehicle V to be serviced is then driven onto the parking space S adjacent the service area A and parked thereon. The operator-attendant of the direct service unit U will then perform the desired services on the vehicle V including supplying fuel to the vehicle V from the service unit U through a filler hose 40. When the servicing operations are complete, the vehicle V is started and moved from the parking space S. Additional vehicles may then be positioned on the parking space S for receiving servicing from the direct service unit U.

In the use and operation of the embodiment of the present invention illustrated in FIGS. 3, 4 and 5, the direct service unit U is driven to the safety zone Z and driven into the fueling lane T. Movement of the direct service unit U along the lane T is guided by the ruts 20.

The vehicles V needing to be serviced are driven into the parking spaces S located adjacent the fueling lane T. The service unit U will then move along the fueling lane T to a position adjacent the parking space S for servicing the vehicle V positioned thereon. The servicing is performed in the usual manner and upon completion the service unit U will move along the fueling lane T to another location for repeating the operation. Should spillage of flammable material occur during the service operation, the spillage will be contained in the fueling lane T to minimize the hazard of fire.

Movement of the direct service unit U along the lane T will break the beam of the electric sensors 25a and 25b to operate the pedestrian gates 24 for blocking pedestrian movement through the pedestrian crossing Y as the direct service unit U moves across the crossing Y. The movement of the direct service unit U will also trip the sensors 36 for effecting movement of the movable barrier section 22 to the upper position blocking inadvertent movement of the vehicle V into the fueling lane T.

The foregoing disclosure and description of the invention are illustrative and explanatory thereof, and various changes in the size, shape and materials as well as in the details of the illustrated construction may be made without departing from the spirit of the invention.

What is claimed is:

1. A safety zone fuel system for providing service to vehicles with a mobile direct service unit in a vehicle parking lot, including:
    a. a safety zone comprising a parking surface area for the mobile direct service unit and a vehicle to be serviced;
    b. a service area surface within said safety zone for the mobile direct service unit; and
    c. a vehicle parking space adjacent said service area and within said safety zone for a vehicle to receive service from the mobile direct service unit;
    d. a fixed barrier guard rail mounted in said service area surface above said service area surface for protecting the service unit when the service unit is in the safety zone;
    e. a boundary marker about the periphery of said safety zone defining the limits of the safety zone to alert the public of the safety zone service operations; and
    f. plural upstanding indicating markers to alert the public of the safety zone service operations.

2. The invention as set forth in claim 1, wherein said vehicle parking space comprises:
    a plurality of vehicle parking spaces adjacent said service area for a plurality of vehicles to receive service from the mobile direct service unit.

3. The invention as set forth in claim 2 wherein:
    a. said service area includes a fueling lane for movement of the mobile direct service unit along said lane to a desired location to service a vehicle in one of said plurality of vehicle parking spaces.

4. The invention as set forth in claim 3 wherein said fueling lane includes:
    means for guiding movement of the mobile direct service unit along said fueling lane.

5. The invention as set forth in claim 3, including:
    said fueling lane having a surface shaped to contain thereon any flammable fluid deposited thereon wherein fuel spills are confined to the fueling lane.

6. The invention as set forth in claim 3, further including:
    a. a movable barrier section operable to and from a first position for enabling pedestrian traffic to cross said fueling lane, and to and from a second position for blocking undesired movement of a vehicle into said fueling lane; and
    b. means with said movable section for movement of said movable section to and from said first and said second position wherein said section moves to enable pedestrians to cross said fueling lane.

7. The invention as set forth in claim 6, including:
    control means for automatically actuating said means for movement of said movable barrier section to move said section to said second position when the mobile direct service unit is adjacent said section wherein said barrier section is automatically moved into the vehicle blocking position when the mobile direct service unit moves by said section.

8. The invention of claim 6, further including:
    a. a pedestrian gate for controlling pedestrian movement across said fueling lane;
    b. a frame mounted with said fixed barrier guard rail mounting said pedestrian for movement to control pedestrian movement across the fueling lane.

* * * * *